US006721895B1

(12) United States Patent
Manabe (10) Patent No.: US 6,721,895 B1
(45) Date of Patent: Apr. 13, 2004

(54) DATA COMMUNICATIONS SYSTEM AND DATA COMMUNICATIONS METHOD (75) Inventor: Koji Manabe, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/539,502

(22) Filed: Mar. 30, 2000

(30) Foreign Application Priority Data

Apr. 1, 1999 (JP) .......................................... 11-095387

(51) Int. Cl.⁷ .................. G06F 13/38; G06F 12/16; G06F 5/06
(52) U.S. Cl. ................ 713/400; 713/600; 711/167; 710/52
(58) Field of Search ................. 713/600, 400, 713/501; 710/15, 52, 8; 709/253; 711/167

(56) References Cited

U.S. PATENT DOCUMENTS

| 4,519,083 A | * | 5/1985 | Hanson ................... 375/338 |
| 4,727,476 A | * | 2/1988 | Rouchon .................. 703/21 |
| 5,007,020 A | * | 4/1991 | Inskeep ................... 711/200 |
| 5,249,184 A | * | 9/1993 | Woest et al. ............. 370/402 |
| 5,307,462 A | * | 4/1994 | Hastings ................. 710/10 |
| 5,319,772 A | * | 6/1994 | Hwang ................... 713/501 |
| 5,423,026 A | * | 6/1995 | Cook et al. .............. 714/23 |
| 5,857,112 A | * | 1/1999 | Hashemi et al. ........... 710/8 |
| 6,011,978 A | * | 1/2000 | Ault et al. .............. 455/552 |
| 6,098,115 A | * | 8/2000 | Eberhard et al. ........... 710/7 |
| 6,101,614 A | * | 8/2000 | Gonzales et al. .......... 714/6 |
| 6,189,073 B1 | * | 2/2001 | Pawlowski ............... 711/120 |
| 6,317,234 B1 | * | 11/2001 | Quayle ................... 359/125 |
| 6,381,684 B1 | * | 4/2002 | Hronik et al. ............ 711/167 |
| 6,425,019 B1 | * | 7/2002 | Tateyama et al. .......... 710/11 |

FOREIGN PATENT DOCUMENTS

| JP | 8-18584 | 1/1996 |
| JP | 10-322373 | 12/1998 |
| JP | 11-355329 | 12/1999 |

OTHER PUBLICATIONS

US 6,584,524, 6/2003, Fukunaga et al. (withdrawn)*
Japanese Office Action dated Dec. 25, 2001 (w/English translation of relevant portions).

* cited by examiner

Primary Examiner—Thomas Lee
Assistant Examiner—Mark Connolly
(74) Attorney, Agent, or Firm—Dickstein, Shapiro, Morin & Oshinsky, LLP.

(57) ABSTRACT

A data communications system and a data communications method enable disappearance of digital AV data arranged into data packet to be prevented. An initialized state detector monitors the state of a transmission line whether or not an initialization protocol of a transmission line occurs. A packet controller arranges the digital AV data into data packet. When the transmission line is under the bus reset condition, it causes output of the digital AV data arranged into data packet to be interrupted due to control of a timing controller. While when the transmission line is not under the bus reset condition, it causes the digital AV data arranged into the data packet to be sent to the transmission line. A reception equipment connected to the transmission line receives the digital AV data arranged into the data packet sent from the transmission equipment before linking. Consequently, even though communication among the equipments is interrupted temporarily caused by the bus reset and so forth, it is capable of transmitting the whole data packets without omission, thus it becomes possible to transmit the picture and/or the sound without interruption.

10 Claims, 6 Drawing Sheets

DATA COMMUNICATIONS SYSTEM AND DATA COMMUNICATIONS METHOD

BACKGROUND OF THE INVENTION

The present invention relates to a data communications system and a data communications method. More to particularly, this invention relates to a data communications system and a data communications method wherein digital communication data is arranged into data packet before being transmitted.

DESCRIPTION OF THE PRIOR ART

In recent years, in the data communications system and the data communications method, it tends to use digital signal. For instance, the AV (Audio-Video) data which had been treated by the user as the analog data in the past. At present, the AV data is treated by the user as the digital data itself. In recent years, the AV data is treated as the digital data itself due to spread of digital satellite broadcast, internet communication, DVD (Digital Video Desk) and so forth. Further, IEEE 1394 high speed serial bus which is capable of transmitting digital data in high speed is made practicable. Thus, it is capable of easily transmitting the AV data with high quality among equipments. It is capable of delivering such the high quality AV data to the user.

Figure 1:
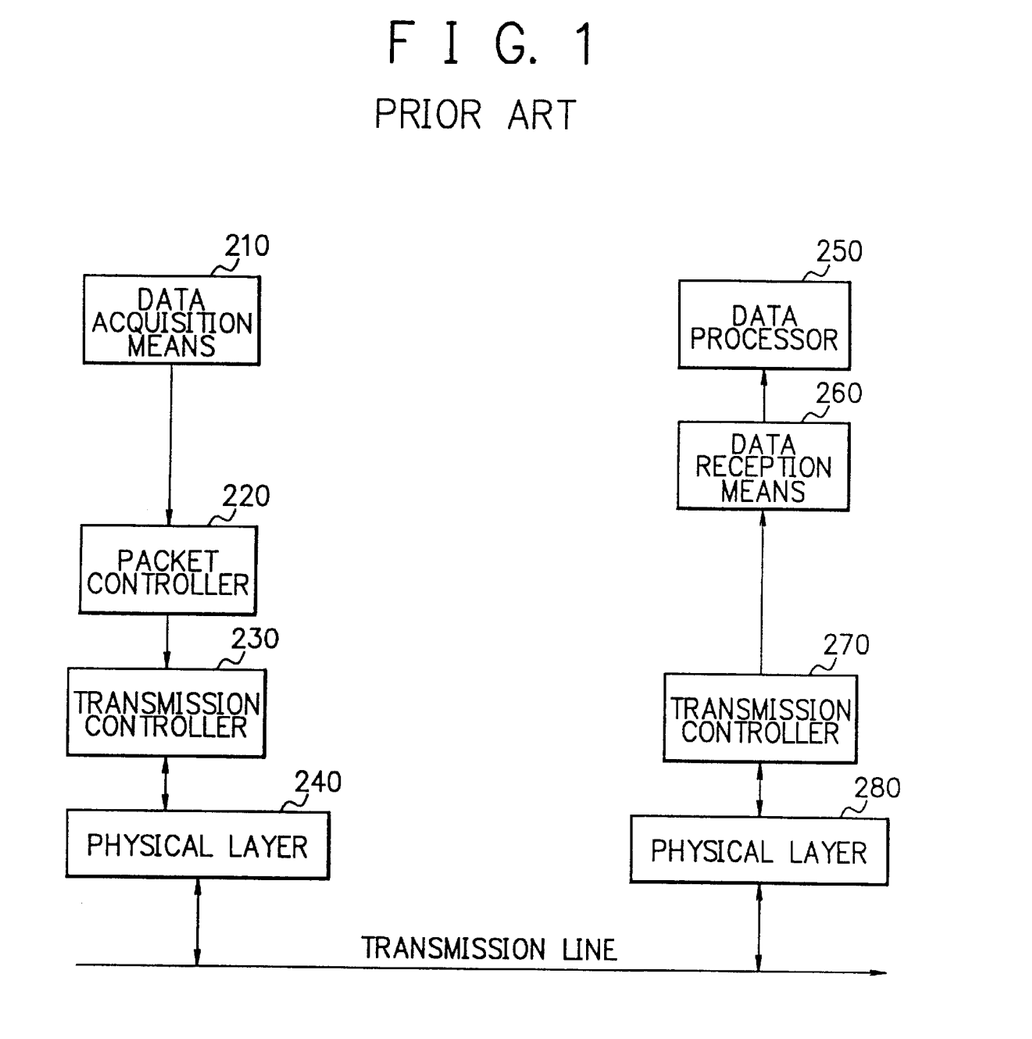
FIG. 1 is a block diagram showing constitution example of a conventional data communications system.
Figure 2:
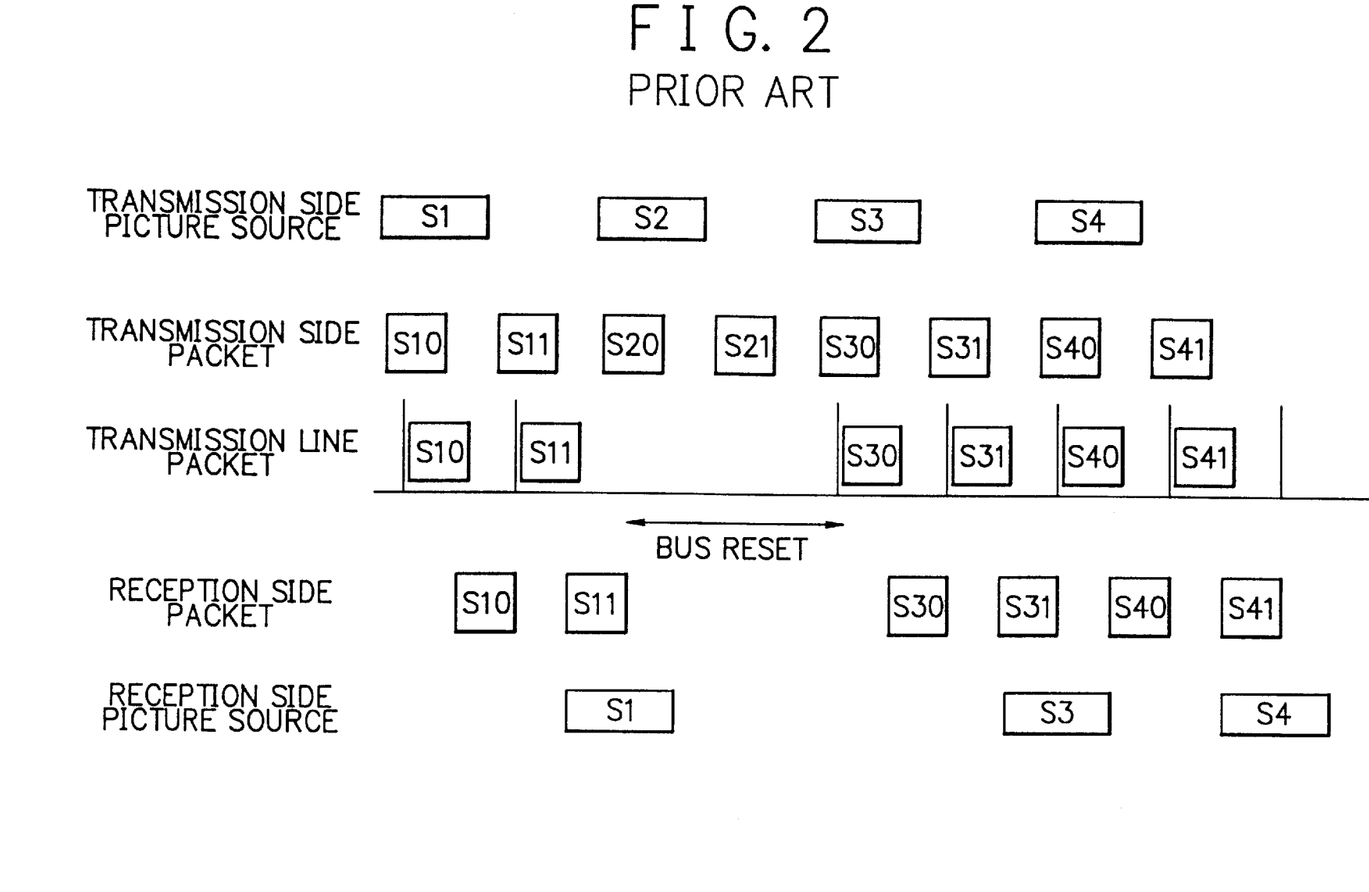
FIG. 2 is a timing chart showing operation example of the conventional data communications method.

A conventional data communications system and a data communications method have a configuration shown in FIG. 1. The data communications system and the data communications method execute transmission of the data in accordance with timing chart shown in FIG. 2. Referring to FIG. 1, a conventional transmission equipment fundamentally consists of a data acquisition means 210, a packet controller 220, a transmission controller 230, and a physical layer 240. A conventional reception equipment fundamentally consists of a data processor 250, a data reception means 260, a transmission controller 270, and a physical layer 280.

These transmission equipment and reception equipment are connected with each other by a transmission line. The data acquisition means 210 acquires the digital AV data through the media (not illustrated), for instance, the broadcast media of the digital satellite broadcast or so forth, the communication media of the internet or so forth, or the storage media such as the DVD or so forth.

The packet controller 220 arranges the above digital AV data into the packet-shaped data (hereinafter referred to as data packet). The transmission controller 230 executes transmission control of the data packet. The physical layer 240 sends out the data packet to the transmission line. The physical layer 280 receives the data packet from the transmission line. The transmission controller 270 implements reception control of the above data packet. The data reception means 260 forms digital AV data while linking these data packets. The data processor 250 executes processing of the digital AV data. Here, the data processing is selection of the digital AV data, demodulation of the digital AV data, D/A conversion of the digital AV data, video display of the digital AV data, audio regeneration of the digital AV data, and so forth. There are two kinds of the transmission modes of the packet transmission in the cases where IEEE 1394 is used for the transmission line. Such the two kinds of transmission modes are an asynchronous type transmission mode for transmitting a control instruction and so forth and a synchronous type transmission mode for transmitting the AV data and so forth, whose transfer band is guaranteed.

In the synchronous type transmission, it is capable of being invariably executed one time of transmission in every one transfer cycle, for instance, in every 125 μsec. For that reason, the delay time and the transfer band are guaranteed. Thus, it is capable of transmitting the picture and the sound and so forth of real time without quality deterioration.

However, in the data communications method constituted in such the above described conventional technique, there is the problem that when the transmission line is initialized during data communications, the communication is interrupted. For instance, referring to FIG. 2, a bus reset occurs on the transmission line, disappearance of the data packet occurs on the transmission line, thus, it is incapable of receiving a part of the data packet on the reception side. Namely, only the picture sources S1, S3, and S4 within the picture sources S1, S2, S3, and S4 are received, and the picture source S2 can not be received caused by the fact that the picture source S2 is in the course of occurrence of the bus reset. As a result thereof, when it causes the picture source received by the reception equipment to be processed, the situation occurs that it is incapable of regenerating the picture corresponding to the picture source S2. For that reason, the regenerated picture is interrupted.

The proposal for resolving problem in relation to above described bus reset is well known. However, it is incapable of avoiding disappearance of the packet. For instance, the official report of the Japanese Patent Application Laid-Open No. HEI 8-18584 discloses technique that connection information of the equipment maintained beforehand, when the bus reset occurs during data communications, it causes connection of the equipment to be executed again on the basis of the maintained connection information. However, it is incapable of avoiding disappearance of the data packet during the bus reset too.

As is clear from the above description, in the conventional data communications method, there is the problem that a part of the packet is lost during the bus reset.

SUMMARY OF THE INVENTION

In view of the foregoing, it is an object of the present invention, in order to overcome the above mentioned problem, to provide a data communications system and a data communications method which are capable of avoiding disappearance of the digital AV data which is arranged into the data packet.

According to a first aspect of the present invention, in order to achieve the above mentioned object, there is provided a data communications system which comprises an initialized state detector for monitoring state of a transmission line whether or not the transmission line is an initialized state, a data storage means for storing therein an inputted data before outputting the data, and a timing controller, when the initialized state detector detects that the transmission line is under the initialized state, the timing controller causes control instruction to be issued for stopping output of the data temporarily in order to store the data in the data storage means, while when the initialized state detector detects the state that initialized state of the transmission line is released, the timing controller instructs that it causes data including the stored data to be outputted, wherein the data communications system enables disappearance of the transmit data to be prevented, which disappearance of the transmit data occurs caused by temporal interruption condition according to initialization of the transmission line.

Consequently, it is capable of preventing disappearance of the transmit data. The disappearance of the transmit data occurs caused by temporal interruption condition according to initialization of the transmission line.

According to a second aspect of the present invention, in the first aspect, there is provided a data communications system, which further comprises a data acquisition means for acquiring data from storage medium such as a DVD, a hard disk or the like and/or data medium such as an internet or the like, a packet controller for arranging data acquired by the data acquisition means into a data packet, and a transmission controller for controlling transmission of the data which is made the data packet by the packet controller, wherein, as to a communication means using a packet switching system to be efficient in data transmission, the data communications system enables disappearance of the transmit data to be prevented, which disappearance of the transmit data occurs caused by temporal interruption condition according to initialization of the transmission line.

Consequently, in the communication means using the packet switching system to be efficient in the data transmission, it is capable of preventing disappearance of the transmit data. The disappearance of the transmit data occurs caused by temporal interruption condition according to initialization of the transmission line.

According to a third aspect of the present invention, in the second aspect, there is provided a data communications system, which further comprises a second transmission controller for controlling data transmitted through the transmission line, a data reception means for receiving data selected by the transmission controller, and a data processor for implementing compound processing of the data received by the data reception means, wherein even though it causes initialization of the transmission line to be executed during data transfer, it is capable of transmitting the whole data without losing the data, and the packet which is used for transmission has a sequence property, thus it is capable of preventing a reversal of the sequence in compound processing.

Consequently, even though it causes initialization of the transmission line to be executed during data transfer, it is capable of transmitting the whole data without losing the data. The packet which is used for transmission has a sequence property, thus it is capable of preventing a reversal of the sequence in compound processing.

According to a fourth aspect of the present invention, in the first aspect, there is provided a data communications system, wherein there is provided a means for achieving function as a bridge for a plurality of transmission lines by the fact that it causes the data received by said data reception means through said second transmission controller to be used as the data should be inputted to said data storage means.

Consequently, since it becomes possible to communicate in the mutual transmission lines while separating respective transmission lines, it becomes possible to increase the number of the equipments connectable to the transmission line. Further, it is capable of holding interruption condition caused by the initialization of the transmission line within the transmission line concerned, thus it is capable of preventing influence thereof from spreading to the whole network.

According to a fifth aspect of the present invention, there is provided a data communications method which comprises the steps of an initialized state detecting step for monitoring state of a transmission line whether or not the transmission line is under initialized state, a data storing step for storing inputted data before outputting, and a timing controlling step when the initialized state detecting step detects that the transmission line is under the initialized state, the timing controlling step causes control instruction to be issued for stopping output of the data temporarily in order to store the data in the data storing step, while when the initialized state detecting step detects the state that initialized state of the transmission line is released, the timing controlling step instructs that it causes data including the stored data to be outputted, wherein the data communications method enables disappearance of the transmit data to be prevented, which disappearance of the transmit data occurs caused by temporal interruption condition according to initialization of the transmission line.

Consequently, it is capable of preventing disappearance of the transmit data. The disappearance of the transmit data occurs caused by temporal interruption condition according to initialization of the transmission line.

According to a sixth aspect of the present invention, in the fifth aspect, there is provided a data communications method, which further comprises the steps of a data acquiring step for acquiring data from storage medium such as a DVD, a hard disk or the like and/or data medium such as an internet or the like, a packet controlling step for arranging data acquired by the data acquiring step into a packet, and a transmission controlling step for controlling transmission of the data which is made the data packet by the packet controlling step, wherein, as to a communication step using a packet switching method to be efficient in data transmission, the data communications method enables disappearance of the transmit data to be prevented, which disappearance of the transmit data occurs caused by temporal interruption condition according to initialization of the transmission line.

Consequently, in the communication process using the packet switching system to be efficient in the data transmission, it is capable of preventing disappearance of the transmit data. The disappearance of the transmit data occurs caused by temporal interruption condition according to initialization of the transmission line.

According to a seventh aspect of the present invention, in the sixth aspect, there is provided a data communications method, which further comprises the steps of a second transmission controlling step for controlling data transmitted through the transmission line, a data reception step for receiving data selected by the transmission controlling step, and a data processing step for executing compound processing of the data received by the data reception step, wherein even though it causes initialization of the transmission line to be executed during data transfer, it is capable of transmitting the whole data without losing the data, and the data packet which is used for transmission has a sequence property, thus it is capable of preventing a reversal of the sequence in compound processing.

Consequently, even though it causes initialization of the transmission line to be executed during data transfer, it is capable of transmitting the whole data without losing the data. The packet which is used for transmission has a sequence property, thus it is capable of preventing a reversal of the sequence in compound processing.

According to an eighth aspect of the present invention, in the fifth aspect, there is provided a data communications method, wherein there is provided a step for achieving function as a bridge to a plurality of transmission lines by the fact that it causes the data received by the data reception step through the second transmission controlling step to be used as the data should be inputted to the data storing step.

Consequently, since it becomes possible to communicate in the mutual transmission lines while separating respective transmission lines, it becomes possible to increase the number of the equipments connectable to the transmission line. Further, it is capable of holding interruption condition caused by the initialization of the transmission line within the transmission line concerned, thus it is capable of preventing influence thereof from spreading to the whole network.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENT

A preferred embodiment of the data communications system and a data communications method of the present invention will be described in detail in accordance with the accompanying drawings. Referring to FIGS. 3 to 7, drawings for explaining constitution of the data communications system and the data communications method of the present invention are shown.

Figure 3:
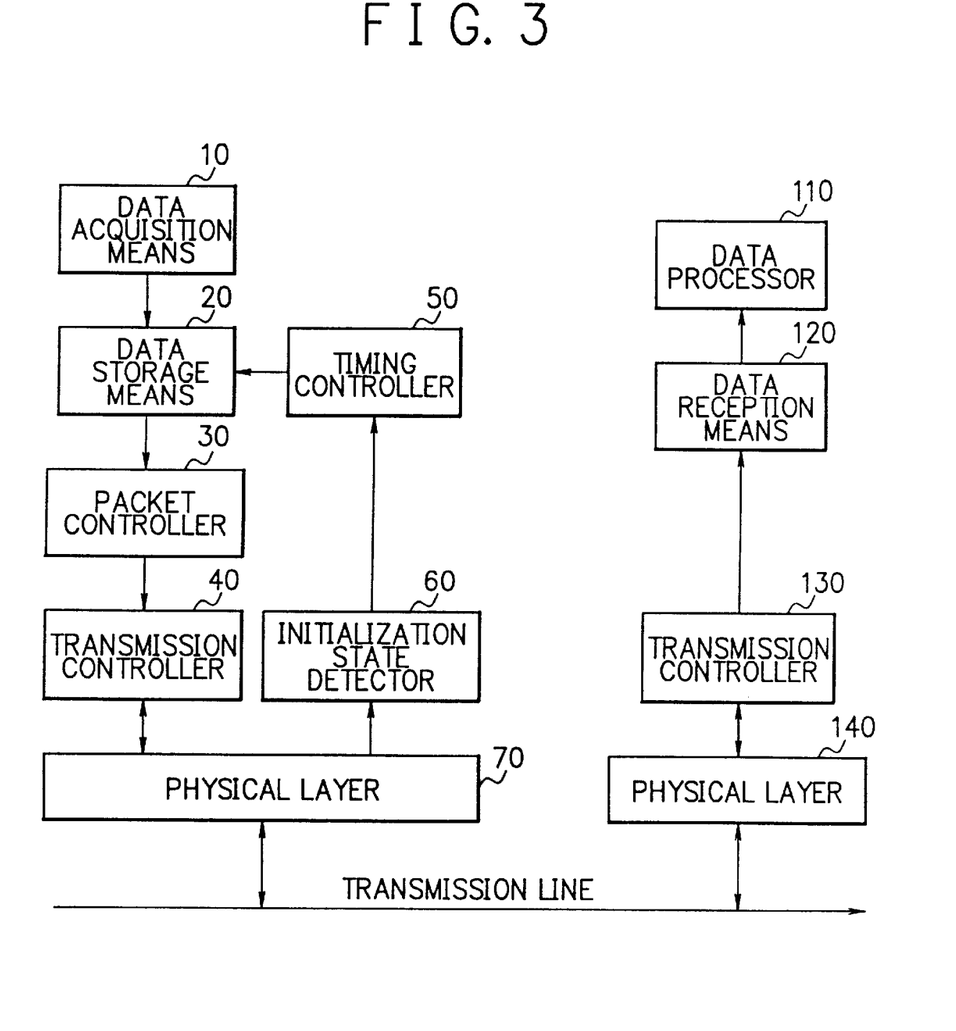
FIG. 3 is a block diagram showing constitution example of one embodiment of a data communications system of the present invention.

FIG. 3 is a block diagram showing constitution example of the data communications device of the present invention. Referring to FIG. 3, fundamental elements constituting a transmission equipment are a data acquisition means 10, a data storage means 20, a packet controller 30, a transmission controller 40, a timing controller 50, an initialized state detector 60, and a physical layer 70. Further, fundamental elements constituting a reception equipment are a data processor 110, a data reception means 120, a transmission controller 130, and a physical layer 140.

The transmission equipment is connected to the reception equipment by a transmission line. Here, the transmission equipment and the reception equipment are electronic equipments which transmit the digital AV data, and/or which receive the digital AV data. These electronic equipments are, for instance, a digital satellite broadcast receiver, an internet connection terminal, a digital video camera, a digital video tape recorder, a DVD player, a personal computer, and so forth. Further, a suitable transmission line is IEEE 1394 high speed serial bus (hereinafter referred to as IEEE 1394 high speed serial bus).

The data acquisition means 10 acquires the digital AV data through the media which are not illustrated, for instance, the broadcast media of digital satellite broadcast or so forth, the communication media of an internet or so forth, the storage media of a DVD or so forth. The data storage means 20 stores therein above described digital AV data temporarily. The packet controller 30 receives the digital AV data from the data storage means 20 to arrange the digital AV data into the data packet. The transmission controller 40 executes the transmission control of the data packet. The physical layer 70 sends out the data packet to the transmission line.

The initialized state detector 60 monitors state through the physical layer 70 whether or not initialization protocol (hereinafter referred to as bus reset) of the transmission line occurs. When the initialized state detector 60 detects that the transmission line is bus reset state, the initialized state detector 60 informs the effect to the timing controller 50. The timing controller 50 instructs to the data storage means so as to interrupt data output during the transmission line being under the bus reset state. While when the transmission line is not the bus reset state, the timing controller 50 instructs that it causes the data output to be executed.

The physical layer 140 receives the data packet from the transmission line. The transmission controller 130 executes reception control of the above described data packet. The data reception means 120 forms the digital AV data while linking the above data packets.

The data processor 110 executes processing of the digital AV data. Here, the processing means selection of the digital AV data, demodulation of the digital AV data, D/A conversion of the digital AV data, video display of the digital AV data, audio regeneration of the digital AV data and so forth. A suitable digital AV data is MPEG (Moving Picture Expert Group) transport stream. There are two kinds of the transmission modes of the packet transmission in the cases where IEEE 1394 is used for the transmission line. Such the two kinds of transmission modes are an asynchronous type transmission mode for transmitting control instruction and so forth and a synchronous type transmission mode for transmitting the AV data and so forth whose transfer band is guaranteed.

In the synchronous type transmission, it is capable of being invariably executed one time of transmission in every one transfer cycle, for instance, in every 125 $\mu$sec. For that reason, the delay time and the transfer band are guaranteed. Thus, it is capable of transmitting the picture and the sound and so forth of real time without quality deterioration.

Figure 4:
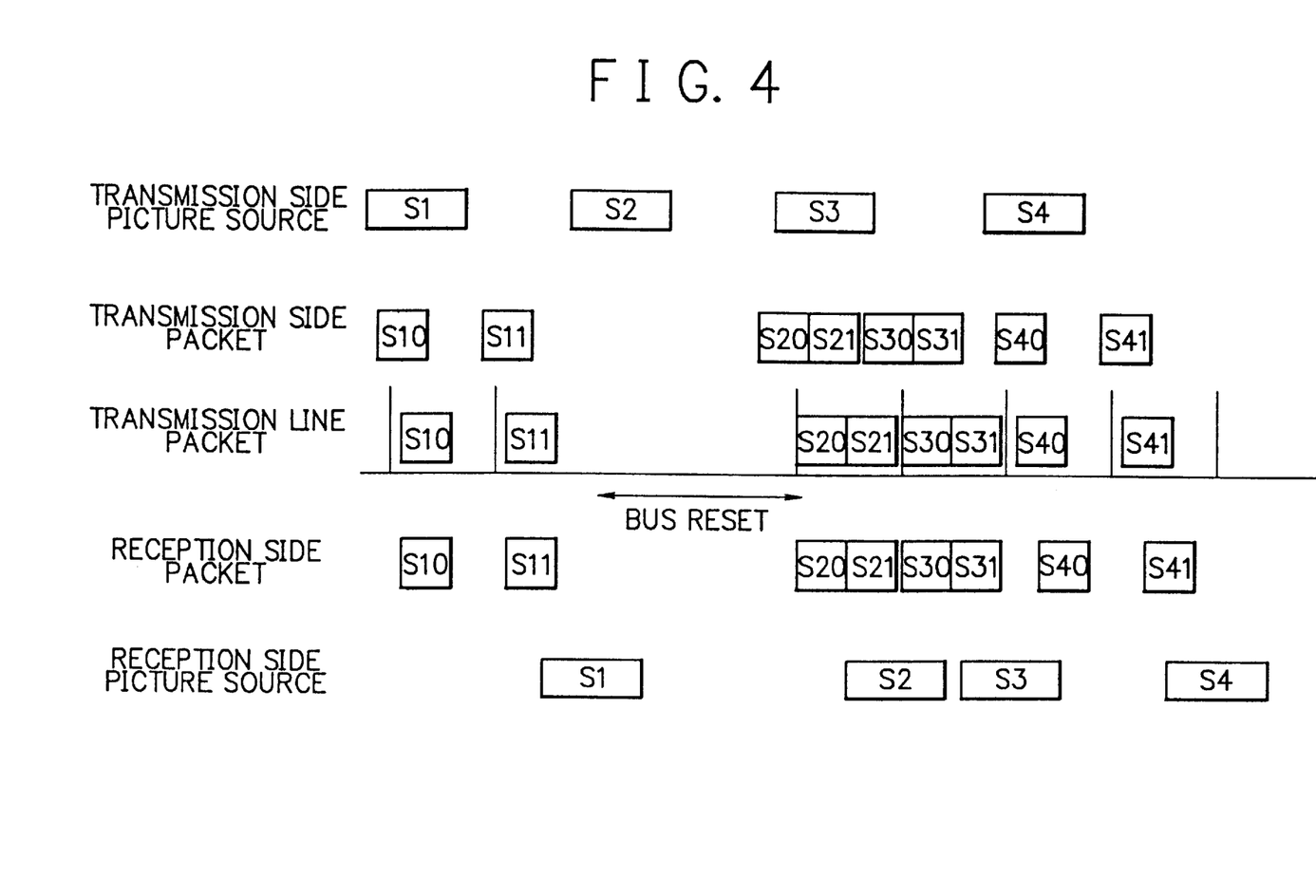
FIG. 4 is a first timing chart showing operation example of the data communications method of the present invention.
Figure 5:
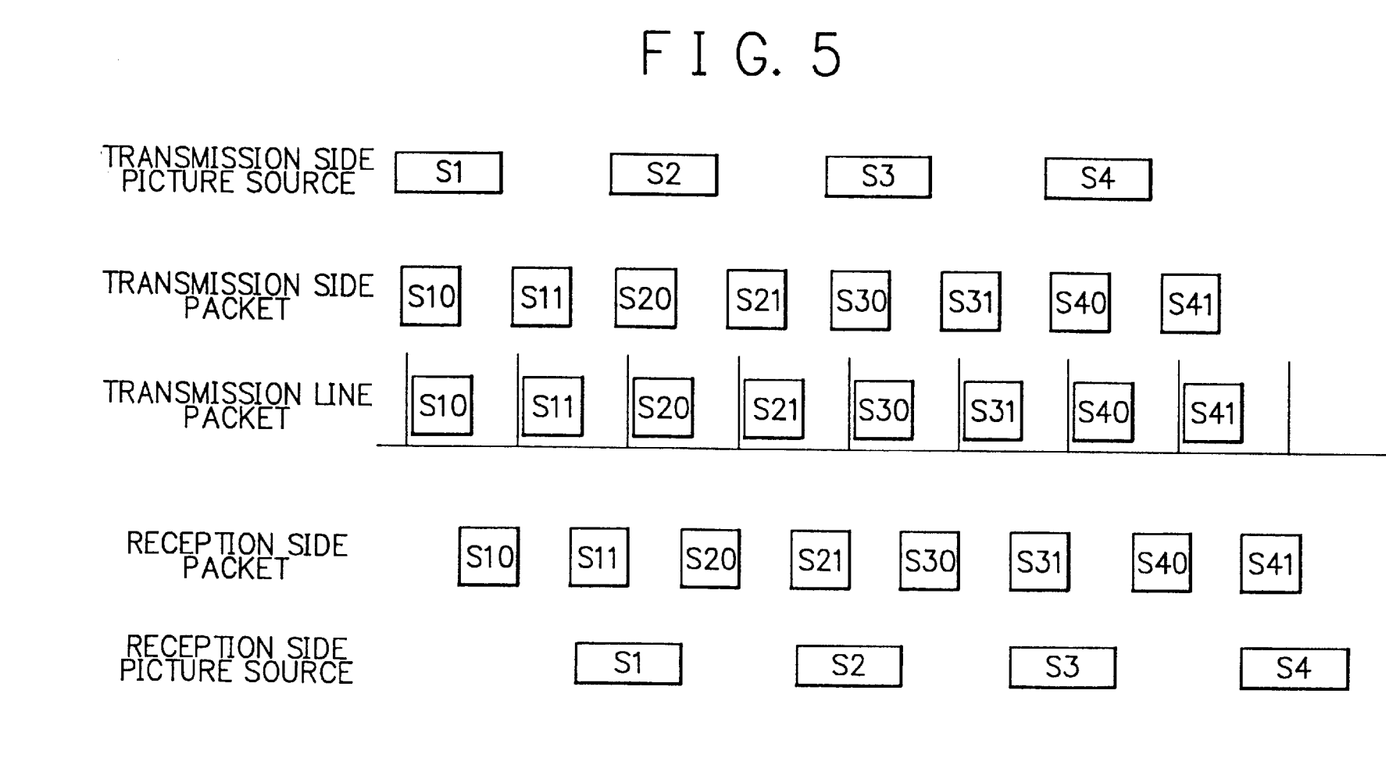
FIG. 5 is a second timing chart showing operation example of the data communications method of the present invention.

Next, operation of the data communications method will be described. FIGS. 4 and 5 are timing charts showing operation example of the data communications method of the present invention. Firstly, referring to FIG. 5, the transmission equipment arranges transmission side picture sources S1, S2, S3, and S4 into the data packet of transmission side packets S10, S11, S20, S30, S31, S40, and S41, before transmitting on the transmission line. The reception equipment receives respective reception side packets of S10, S11, S20, S30, S31, S40, and S41, through the transmission line, before the reception equipment obtains the reception side picture sources S1, S2, S3, and S4 while linking them.

FIG. 4 is a view showing operation example in the case where the bus reset occurs during data communications. The example shows that it causes the transmission side packets S10 and S11 to be transmitted, before the bus reset occurs. During the period of the bus reset, it causes the transmission of the transmission side packet to be interrupted. After termination of the bus reset, subsequent packets namely S20, S30, S31, S40, and S41, are transmitted.

Here, there will be described the bus reset. A transmission line such as the IEEE 1394 high speed serial bus which exceeds function of 'plug & play' has an automatic constitution protocol of the bus. In the initialization of the bus, the tree-ID-process for determining parent-child relationship among the nodes is implemented following the bus reset. The respective nodes recognize the parent-child relationship concerning adjacent nodes connected to the own ports therebetween. Subsequently, it causes a node so called as the route for managing the arbitration right of the whole bus to be determined. Next, allocation of the node ID is implemented, before the self-ID-process is implemented for informing the information such as operation speed of respective nodes or the number of the port or so forth. Lastly, "ISOCHRONOUSRESOURCEMANAGER" for managing the resource for the sake of the synchronous type transmission mode is determined. A cycle master for managing cycle is determined. A bus manager for implementing topology and speed information of the bus, and a power management is determined. Thus, initialization of the bus is completed.

Figure 6:
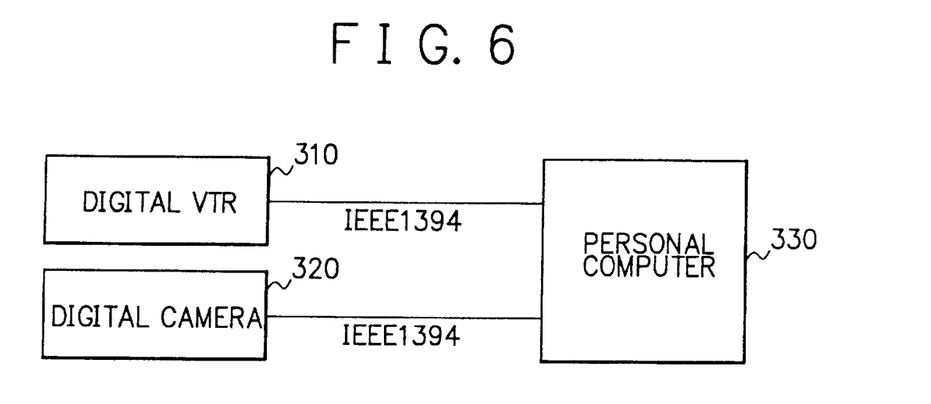
FIG. 6 is a view showing constitution example in which a digital VTR is connected to a personal computer 330 through IEEE 1394.

The above-descried one series of operation is invariably generated whenever it occurs connection of the equipment and/or disconnection of the equipment. Namely, even though certain two equipments are in the course of transmission using the digital AV data, the bus reset occurs whenever the third equipment is connected to such the transmission line in use. For instance, as shown in FIG. 6, the digital VTR 310 is connected to the personal computer 330 through the IEEE 1394 high speed serial bus. The digital VTR 310 and the personal computer 330 implement the transmission of MPEG (Moving Picture Expert Group) transport stream. On this occasion, it causes the digital camera 320 as the third equipment to be connected to the IEEE 1394 high speed serial bus, with the result that the bus reset occurs.

According to the above described embodiment, in the data communications system and the data communications method which are connected by using digital transmission line such as IEEE 1394 high speed serial bus and so forth, it is capable of transmitting the whole data packet without omission even though the communication is interrupted temporarily caused by the bus reset and so forth. Consequently, it is capable of transmitting the picture and/or the sound without interruption.

The reason why it causes the output of the data storage means 20 to be stopped during period of the bus reset, while when the bus reset is terminated, it causes the output of the data storage means 20 to be resumed. For that reason, it is capable of preventing the fact that the data concerned is erased as unknown destination packet during period of the bus reset.

Figure 7:
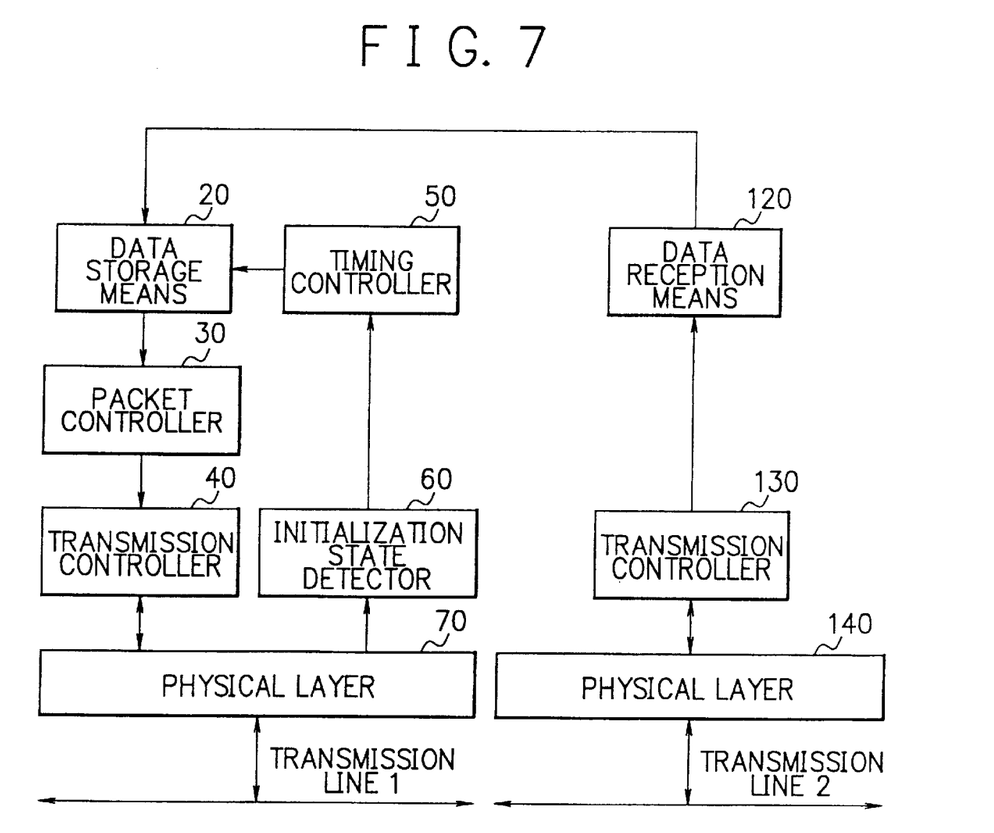
FIG. 7 is a block diagram showing a constitution example of another embodiment of the data communications system of the present invention.

Next, there will be described another embodiment of the present invention in detail referring to the drawing. Referring to FIG. 7, the data communications system of the present embodiment comprises a data storage means 20, a packet controller 30, a transmission controller 40, a timing controller 50, an initialized state detector 60, a physical layer 70, a data reception means 120, a transmission controller 130, a physical layer 140, a transmission line 1, and a transmission line 2. The data communications system of the present embodiment functions as a bridge between the transmission line 1 and the transmission line 2.

Here, the bridge is a circuit module which enables the communication for mutual transmission lines to be implemented while separating transmission line. The number of connectable equipments is capable of increasing by the bridge. The bridge enables the bus reset to be held within one transmission line. Thus, it is capable of preventing the influence of the bus reset which is spread to the whole network.

The physical layer. 140 receives the data packet from the transmission line 2. The transmission controller 130 executes reception control of the above described data packet. The data reception means 120 forms a digital AV data while linking the above-described data packets. The data storage means 20 stores therein the digital AV data temporarily. The packet controller 30 receives the digital AV data from the data storage means 20 to arrange it into data packet. The transmission controller 40 executes transmission control of the above-described data packet.

The physical layer 70 sends out the data packet to the transmission line. The initialized state detector 60 monitors the state through the physical layer 70 whether or not the bus reset of the transmission line occurs. The initialized state detector 60 detects that the transmission line is under the bus reset state, thus informing the effect to the timing controller 50. The timing controller 50 instructs to the data storage means 20 so as to interrupt data output during period when the transmission line is under the bus reset state, while when the transmission line is not under the bus reset state, the timing controller 50 instructs so as to execute the data output.

Another embodiment is that the packet controller 30 is provided with a function causing the packet to be reconstituted. In the present embodiment, for instance, it causes six packets S20, S21, S30, S31, S40, and S41 to be reconstituted into new four packets. These new packets are transmitted by four transfer cycles. Here, the number of packet before reconstituting the packet is taken as N1. The size of the average of the packet is taken as L1. The number of the packet after reconstituting the packet is taken as N2. The size of the average of the packet is taken as L2. In these conditions, it is good that if the relationship $N1 \times L1 = N2 \times L2$ is realized. According to the present embodiment, after termination of the bus reset, it is capable of reducing degree of increase of the transfer band temporarily.

Furthermore, as the another embodiment, it is capable of applying both of the data communications system and the data communications method of the present embodiment to the conventional techniques without losing effect of the conventional technique. Such the conventional technique is that it causes the connection information of the equipments to be maintained, and when the bus reset occurs during data communications, connection among the equipments is implemented again on the basis of such the connection information which is maintained. The another conventional technique is that it causes the digital AV data to be transmitted while coding it for the sake of copyright protection. The present invention exercises the effect to such the conventional techniques without losing the effect of the conventional techniques.

According to the first aspect of the present invention, it is capable of preventing disappearance of the transmit data. The disappearance of the transmit data occurs caused by temporal interruption condition according to initialization of the transmission line.

According to the second aspect of the present invention, even though the disappearance of the transmit data occurs caused by temporal interruption condition according to initialization of the transmission line, since the communication means uses the packet switching system to be efficient in the data transmission, it is capable of preventing disappearance of the transmit data.

According to the third aspect of the present invention, even though it causes initialization of the transmission line to be executed during data transfer, it is capable of transmitting the whole data without losing the data. The data packet which is used for the transmission has a sequence property, thus it is capable of preventing a reversal of the sequence in compound processing.

According to the fourth aspect of the present invention, since it becomes possible to communicate in the mutual transmission lines while separating respective transmission lines, it becomes possible to increase the number of the equipments connectable to the transmission line. Further, it is capable of holding interruption condition caused by the initialization of the transmission line within only the transmission line itself, thus it is capable of preventing influence thereof from spreading to the whole network.

According to the fifth aspect of the present invention, even though the disappearance of the transmit data occurs caused by temporal interruption condition according to initialization of the transmission line, it is capable of preventing disappearance of the transmit data.

According to the sixth aspect of the present invention, even though the disappearance of the transmit data occurs caused by temporal interruption condition according to initialization of the transmission line since the communication process uses the packet switching system to be efficient in the data transmission, it is capable of preventing disappearance of the transmit data.

According to the seventh aspect of the present invention, even though it causes initialization of the transmission line to be executed during data transfer, it is capable of transmitting the whole data without losing the data. The data packet which is used for transmission has a sequence property, thus it is capable of preventing a reversal of the sequence in compound processing.

According to the eighth aspect of the present invention, since it becomes possible to communicate in the mutual transmission lines while separating respective transmission lines, it becomes possible to increase the number of the equipments connectable to the transmission line. Further, it is capable of holding interruption condition caused by the initialization of the transmission line within only the transmission line itself, thus it is capable of preventing influence thereof from spreading to the whole network.

While preferred embodiments of the invention have been described using specific terms, the description has been for illustrative purpose only, and it is to be understood that changes and variations may be made without departing from the spirit or scope of the following claims.

What is claimed is:

1. A data communication system comprising:

an initialized state detector for monitoring a state of a transmission line for whether said transmission line is in an initialized state;

a data storage means for storing therein an input data before outputting the input data; and a timing controller, which when said initialized state detector detects that said transmission line is in the initialized state, said timing controller causes a control instruction to be issued for stopping an output of the input data in order to store the input data in said data storage means, while when said initialized state detector detects that the initialized state of said transmission line is released, said timing controller causes said stored data to be outputted, wherein said data communications system enables disappearance of the input data to be prevented, which disappearance of the input data is caused by a temporal interruption condition according to initialization of said transmission line.

2. A data communication system is claimed in claim 1, further comprising:

a data acquisition means for acquiring data from a storage medium;

a packet controller for arranging data acquired by said data acquisition means into a data packet; and a transmission controller for controlling transmission of the data which is made into the data packet by said packet controller.

3. A data communications system as claimed in claim 2, further comprising:

a second transmission controller for controlling data transmitted through the transmission line;

a data reception means for receiving data selected by said second transmission controller; and a data processor for executing compound processing of the data received by said data reception means, wherein the packet which is used for transmission has a sequence property;

and the system is capable of preventing a reversal of the sequence in the compound processing.

4. A data communications system as claimed in claim 3, wherein the system acts as a bridge for the sake of a plurality of transmission lines by the fact that it causes the data received by said data reception means through said second transmission controller to be used as the data inputted to said data storage means.

5. A data communications method comprising the steps of:

monitoring a state of a transmission line for whether said transmission line is in an initialized state;

storing an input data before outputting the input data; and when said monitoring detects that said transmission line is in the initialized state, issuing a control instruction for stopping output of the input data in order to store the input data, while when said monitoring detects that the initialized state of said transmission line is released, outputting said stored data, wherein said data communication method enables disappearance of the input data to be prevented, which disappearance of the input data is caused by a temporal interruption condition according to initialization of said transmission line.

6. A data communications method as claimed in claim 5, further comprising the steps of:

acquiring step for acquiring data from a storage medium;

arranging data acquired by said acquiring step into a packet; and controlling transmission of the data which is made into the data packet by said arranging step.

7. A data communications method as claimed in claim 6, further comprising the steps of:

second controlling data transmitted through the transmission line;

receiving data selected by said second controlling data step; and executing compound processing of the data received by said receiving data step, wherein the packet which is used for transmission has a sequence property;

and the method is capable of preventing a reversal of the sequence in the compound processing.

8. A data communication method as claimed in claim 7, wherein the method produces a bridge for a plurality of transmission lines by the fact that data received by said receiving data reception step through said second controlling data step to be used as the data inputted to said storing step.

9. The system as recited in claim 1, wherein when said initialized state detector detects that the initialized state of said transmission line is released, said timing controller causes said stored data to be outputted in a shorter interval than if said initialized state detector had not detected that the transmission line was in the initialized state.

10. The method as recited in claim 5, wherein when said monitoring detects that the initialized state of said transmission line is released, the outputting of said stored data is performed in a shorter interval than if said monitoring had not detected that the transmission line was in the initialized state.

* * * * *